US010623903B2

(12) United States Patent
Passler et al.

(10) Patent No.: US 10,623,903 B2
(45) Date of Patent: Apr. 14, 2020

(54) TEMPORAL LOCATION OF MOBILE WLAN STATIONS USING AIRBORNE STATION

(71) Applicant: SR Technologies, Inc., Davie, FL (US)

(72) Inventors: Mark Passler, Boca Raton, FL (US); Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 15/928,289

(22) Filed: Mar. 22, 2018

(65) Prior Publication Data

US 2018/0332435 A1    Nov. 15, 2018

Related U.S. Application Data

(60) Provisional application No. 62/504,153, filed on May 10, 2017.

(51) Int. Cl.
| | |
|---|---|
| *H04W 4/029* | (2018.01) |
| *H04W 64/00* | (2009.01) |
| *H04W 4/42* | (2018.01) |
| *H04L 12/26* | (2006.01) |
| *G01S 5/00* | (2006.01) |
| *H04W 24/04* | (2009.01) |

(52) U.S. Cl.
CPC ............... *H04W 4/029* (2018.02); *G01S 5/00* (2013.01); *H04L 43/028* (2013.01); *H04L 43/10* (2013.01); *H04W 64/00* (2013.01); *H04W 24/04* (2013.01)

(58) Field of Classification Search
CPC ........... H04W 4/00–046; H04W 4/185; H04W 4/30–38
See application file for complete search history.

(56) References Cited

U.S. PATENT DOCUMENTS

| | | | | |
|---|---|---|---|---|
| 2009/0075672 | A1* | 3/2009 | Jones ........................ | G01S 5/02 455/456.1 |
| 2010/0273504 | A1* | 10/2010 | Bull .......................... | G01S 5/02 455/456.1 |
| 2013/0176897 | A1* | 7/2013 | Wang ..................... | H04W 12/06 370/254 |
| 2016/0309337 | A1* | 10/2016 | Priest ..................... | H04W 16/18 |
| 2017/0295031 | A1* | 10/2017 | Bush ....................... | H04L 43/08 |

* cited by examiner

*Primary Examiner* — San Htun
(74) *Attorney, Agent, or Firm* — Christopher & Weisberg, P.A.

(57) ABSTRACT

A method is disclosed that relates to estimating the temporal location of mobile ground based Wi-Fi stations by monitoring a multitude of ground based access points, using an airborne Wi-Fi monitoring device. The airborne monitoring station first identifies and locates ground based access points within the area of interest. The airborne monitoring station monitors the transmission of the ground based stations and access points in the said networks, in particular the probe response management frames, recording the access point and station addresses and the time of reception. The transmissions contain an address of a corresponding ground-based access point and the address of the ground-based mobile station. The airborne monitoring station then matches all the times of the probe responses corresponding to the each station address and together with the location of the access points computes the likely temporal track for each station.

16 Claims, 6 Drawing Sheets

TEMPORAL LOCATION OF MOBILE WLAN STATIONS USING AIRBORNE STATION

CROSS-REFERENCE TO RELATED APPLICATION

This application claims priority to U.S. Provisional Patent Application No. 62/504,153, filed on May 10, 2017, and entitled, TEMPORAL LOCATION OF MOBILE WLAN STATIONS USING AIRBORNE STATION, which is incorporated herein in its entirety.

FIELD

Wireless communications, and in particular to geo-location and tracking of wireless local area network (WLAN) devices.

BACKGROUND

Initially, it is noted that IEEE Standard 802.11-2016 is used as the base reference for disclosures used in this disclosure, the entire contents of which are incorporated herein by reference and is referred to herein as the "Standard". The IEEE 802.11 Standard is commonly referred to as "Wi-Fi". A Wi-Fi network generally consists of an access point (AP) and a number of stations (STA).

Detection and location of a STA, and in particular a smartphone, presents several challenges and the techniques used to detect and locate APs are not sufficient. In the following discussion, where the term STA is used, it may be assumed that reference is generally made to a mobile STA including devices such as smartphone, tablet, and personal computer.

In general, an AP is attached to a constant power supply, is stationary, is permanently active on a single channel, has a relatively high transmit power and is periodically transmitting beacons. In addition an AP is regularly responding to probe requests and will respond probes such as ready-to-send (RTS).

STAs on the other hand may be mobile and have a relatively lower transmit power compared to APs. In addition, STAs will generally have a lower antenna efficiency that an AP which results in the effective receive sensitivity being less than an AP.

A mobile STA may or may not be associated to a network, but more likely will not be associated to an AP. The mobile STA may be conserving power and hence will periodically be in sleep state. However, when active, the mobile STA will be periodically scanning channels either actively, by sending probe requests, or passively by listening to beacons. All of these characteristics make it difficult to directly detect a STA or to locate it using an airborne monitoring station.

If the STA is not already associated with an AP, it will generally be scanning for nearby APs. Most STAs will transmit a broadcast probe request but also may transmit directed probe requests to particular service set identifiers (SSIDs) that it has been associated to in the past. A typical STA will wake, then send a broadcast probe request on a number of channels, pausing long enough to receive any responses before continuing to another channel (assuming a match is not found). The regularity of the scanning and the algorithm that selects broadcast probe or directed probe and channel will likely be proprietary. The scanning will also be somewhat variable in time. For example, if a STA has scanned several times with no positive result, it may wait longer before enacting the scan routine again.

As detailed in the Standard, a probe request transmitted by a STA may be directed to a broadcast address or a specific address. In both cases, the address of the transmitting STA will be included in the request and therefore the STA is uniquely identified.

Deploying Wi-Fi monitoring devices across an area and detecting and logging transmissions from the STAs can provide an indication of the location and track of these STAs. Each transmission from a STA includes a unique identification, the MAC address. By noting the STA transmissions and the time of those transmissions at Wi-Fi monitoring devices situated at fixed locations, the temporal track of that STA may be estimated.

FIG. 1 is a schematic diagram depicting a mobile STA 120 passing a Wi-Fi monitoring device, Monitor 110. STA 120 is moving along a line 130. At time t, when the STA 120 is at position A, the STA 120 transmits a probe request which is received at Monitor 110. Hence at time t, by noting the receipt of a probe request from STA 120, it can be assumed that STA 120 is in the vicinity of Monitor 110. If Monitor 110 is configured to be an AP, then Monitor 110 may respond with a probe response.

FIG. 2 is an exemplary schematic diagram of a ground based mobile STA tracking system. A mobile STA 120 is travelling along a route 230 that passes by three Wi-Fi monitoring devices, Monitor A 211, Monitor B 212, and Monitor C 213. In this example, at times t1, t2 and t3, at positions 1, 2 and 3, 221, 222, and 223, respectively, STA 120 transmits a probe request. At time t1, position 1 221, the probe request is received by Monitor A 211. At time t2, position 2 222, the probe request is received by Monitor B 212. At time t3, position 3 223, the probe request is received by Monitor C 213. The monitoring stations, 211, 212 and 213 may report these times t1, t2 and t3 to a centralized point using a backhaul scheme 240. Hence, at a central point it is possible to record the temporal track of one or more mobile STAs as they pass the monitoring stations and transmit probe requests. Various techniques may be used to track the STA including, for example, a road matching scheme, where the STA is assumed to be on a road. By monitoring and recording the times of the probe requests with respect to the locations of the monitors that received the requests, it may be possible to estimate a temporal track of that particular STA.

The ground based mobile tracking system as described in FIGS. 1 and 2 requires the installation of a number of monitors and the interconnection of them to a central site. The number and actual positions of these monitors will depend upon the area to be covered and in an urban environment may involve large numbers of monitors together with the backbone communications required to interconnect them to a central site where the results may be tabulated and displayed. The setting up of such a system may entail significant time and investment and, if, for example, the area to be covered has any degree of inaccessibility, it may not be practical to set up such a system at all.

SUMMARY

Methods and airborne monitoring stations are disclosed. In some embodiments, a method for an airborne monitoring station of determining a temporal track for a ground-based mobile station is provided. The method includes monitoring transmissions from a plurality of ground-based access points, the transmissions containing an address of a corresponding ground-based access point and the address of the ground-based mobile station. The transmissions are monitored to ascertain an address of each ground-based access point, and determine a time of reception of each transmission from the plurality of ground-based access points. The method also includes determining the temporal track of the ground-based mobile station based at least in part on locations of the plurality of ground-based access points derived from the addresses of the plurality of ground-based access points, and the time of reception of each transmission from the plurality of ground-based access points.

In some embodiments, the addresses of the plurality of ground-based access points and the addresses of the ground-based mobile stations are contained in probe response management frames contained in the transmissions from the plurality of ground-based access points. In some embodiments, a transmission from the ground-based mobile station has a receiving address and each transmission from the plurality of ground-based access points has a transmit station address. In some embodiments, the temporal track is determined by correlating the locations of the plurality ground-based access points with a road map of an area monitored by the airborne monitoring station. In some embodiments, the method further includes monitoring transmissions from the ground-based mobile station to ascertain an address of the ground-based mobile station to differentiate between the ground-based mobile station for which the temporal track is determined from other ground-based mobile stations. In some embodiments, the transmissions from the plurality of ground-based access points contain an address of the ground-based mobile station to differentiate between the ground-based mobile station for which the temporal track is determined from other ground-based mobile stations. In some embodiments, the method further includes recording an address and location of each ground-based access point from which a transmission is received to enable mapping of each ground-based access point based on the address associated with the ground-based access point. In some embodiments, the method further includes filtering the transmissions from the ground-based access points to find probe responses and recording times of receipt of the probe responses to determine a time at which the ground-based mobile station is in proximity to a ground-based access point. In some embodiments, the method further includes correlating the times of receipt with the locations of the ground-based access points to determine a location of the ground-based mobile station with respect to the ground-based access point at each time of receipt.

In some embodiments, an airborne monitoring station configured to determine a temporal track for a ground-based mobile station is provided. The airborne monitoring station includes processing circuitry configured to monitor transmissions from a plurality of ground-based access points, the transmission containing an address of a corresponding ground based access point and an address of the ground-based mobile station. The transmissions are monitored to ascertain an address of each ground-based access point and to determine a time of reception of each transmission from the plurality of ground-based access point. The processing circuitry is further configured to determine the temporal track of the ground-based mobile station based at least in part on locations of the plurality of ground-based access points derived from the addresses of the plurality of ground-based access points and the time of reception of each transmission from the plurality of ground-based access points.

In some embodiments, the addresses of the plurality of ground-based access points and the addresses of the ground-based mobile stations are contained in probe response management frames contained in the transmissions from the plurality of ground-based access points. In some embodiments, a transmission from the ground-based mobile station has a receiving address and each transmission from the plurality of ground-based access points has a transmit station address. In some embodiments, the temporal track is determined by correlating the locations of the plurality ground-based access points with a road map of an area monitored by the airborne monitoring station. In some embodiments, the processing circuitry is further configured to monitor transmissions from the ground-based mobile station to ascertain an address of the ground-based mobile station to differentiate between the ground-based mobile station for which the temporal track is determined from other ground-based mobile stations. In some embodiments, the transmissions from the plurality of ground-based access points contain an address of the ground-based mobile station to differentiate between the ground-based mobile station for which the temporal track is determined from other ground-based mobile stations. In some embodiments, the processing circuitry is further configured to record an address and location of each ground-based access point from which a transmission is received to enable mapping of each ground-based access point based on the address associated with the ground-based access point. In some embodiments, the processing circuitry is further configured to filter the transmissions from the ground-based access points to find probe responses and recording times of receipt of the probe responses to determine a time at which the ground-based mobile station is in proximity to a ground-based access point. In some embodiments, the processing circuitry is further configured to correlate the times of receipt with the locations of the ground-based access points to determine a location of the ground-based mobile station with respect to the ground-based access point at each time of receipt.

In some embodiments, an airborne monitoring station configured to determine a temporal track for a ground-based mobile station is provided. The airborne monitoring station includes a memory configured to store a plurality of ground-based access point addresses and times of receipt of probe responses from the plurality of ground-based access points. The airborne monitoring station further includes a processor configured to monitor the probe responses from the plurality of ground-based access points, each probe response having an address of a ground-based access point and an address of the ground-based mobile station and having a time of receipt at the airborne monitoring station of the probe response. The processor is further configured to determine a location of each ground-based access point based on the address of the ground-based access point. The processor is further configured to determine the temporal track of the ground-based mobile station based at least in part on locations of the plurality of ground-based access points and further based at least in part on the times of receipt of the probe responses from the plurality of ground-based access points. In some embodiments, the processor is further configured to correlate the times of receipt with the locations of the ground-based access points to determine the temporal track of the ground-based mobile station.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

This disclosure relates to the temporal location of mobile ground based stations (STA) that are based upon the IEEE 802.11 technology, commonly known as Wi-Fi. Furthermore, this disclosure relates to the temporal location of mobile ground based STAs by monitoring a multitude of ground based APs, using an airborne Wi-Fi monitoring device.

A method is disclosed where an airborne monitoring STA first identifies and locates ground based networks within an area of interest. Then the airborne monitoring STA monitors the transmission of the ground based STAs and APs in the networks, in particular the probe response management frames, recording the AP and STA addresses and the time of reception. The airborne monitoring STA then matches all the probe responses corresponding to each STA address and, together with the location of the APs, computes the likely temporal track for each STA.

Figure 3:
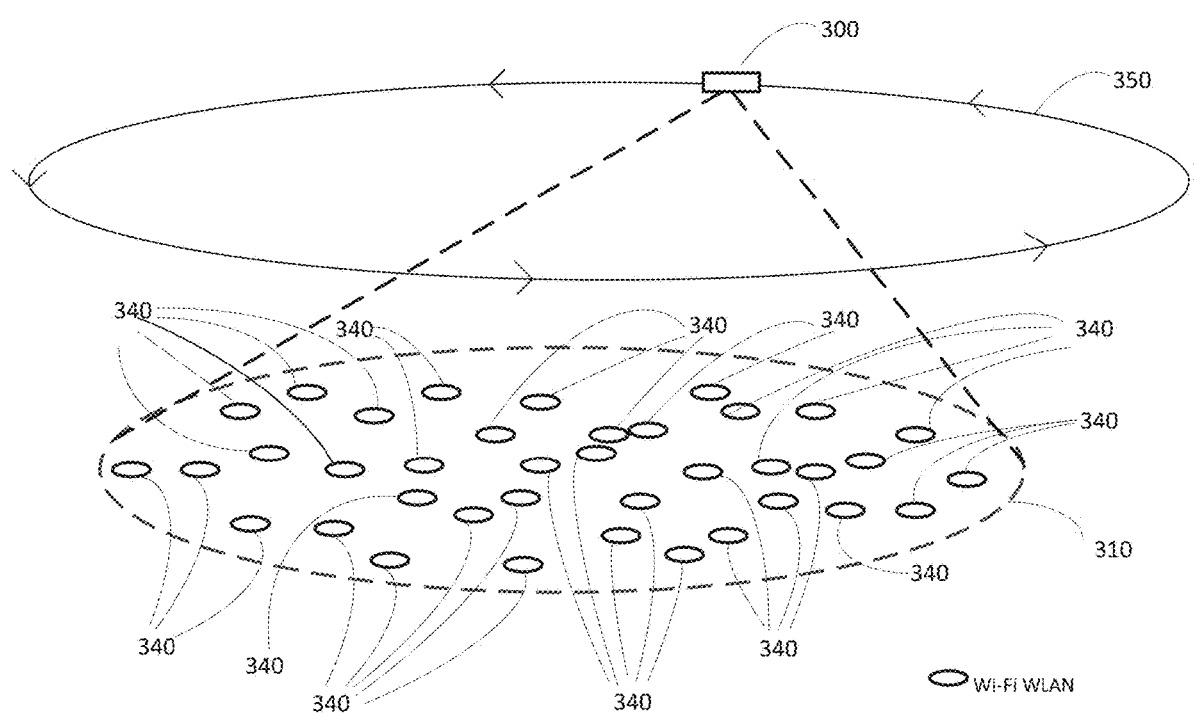
FIG. 3 is a schematic diagram depicting an airborne Wi-Fi monitoring station receiving signals from an area.

FIG. 3 is a schematic diagram depicting an airborne Wi-Fi monitoring station 300 receiving signals from an area 310. Area 310 may be determined by the antenna used at the airborne monitoring station 300. Within area 310 there are a multitude of ground based APs 340. Airborne monitoring STA 300 may be travelling in a pattern or orbit 350 over the area 310. Airborne monitoring STA 300 may use an antenna that tracks the center of the area 310 as the STA 300 travels the pattern or orbit 350 so as to maintain coverage of the area 310. Any transmission from any ground based AP 340 may be received by the airborne monitoring STA 300.

The effective transmitted power of APs is generally more than that for STAs because of better power amplifiers (PA) and more efficient antennas. Also, the sensitivity of an AP is generally better than for a STA, in part because of the more efficient antennas. Although airborne monitoring STA 300 may be configured to receive, monitor and decode all received transmissions, at ranges compatible with an airborne receiver, it is more likely that the AP transmissions from a ground based network of APs 340 are received by the airborne monitoring STA 300 than are transmissions from ground based STAs.

Figure 1:
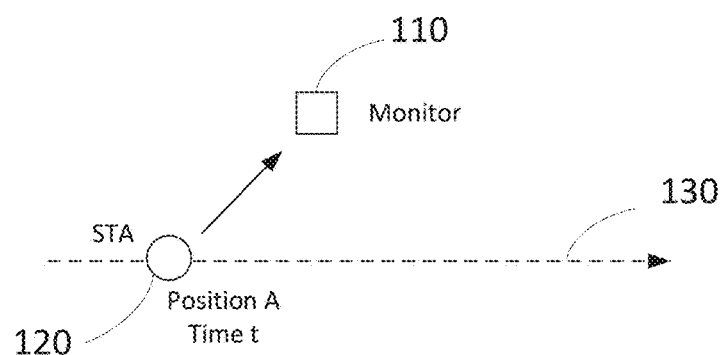
FIG. 1 is a schematic diagram depicting a mobile STA passing a Wi-Fi monitoring device.
Figure 2:
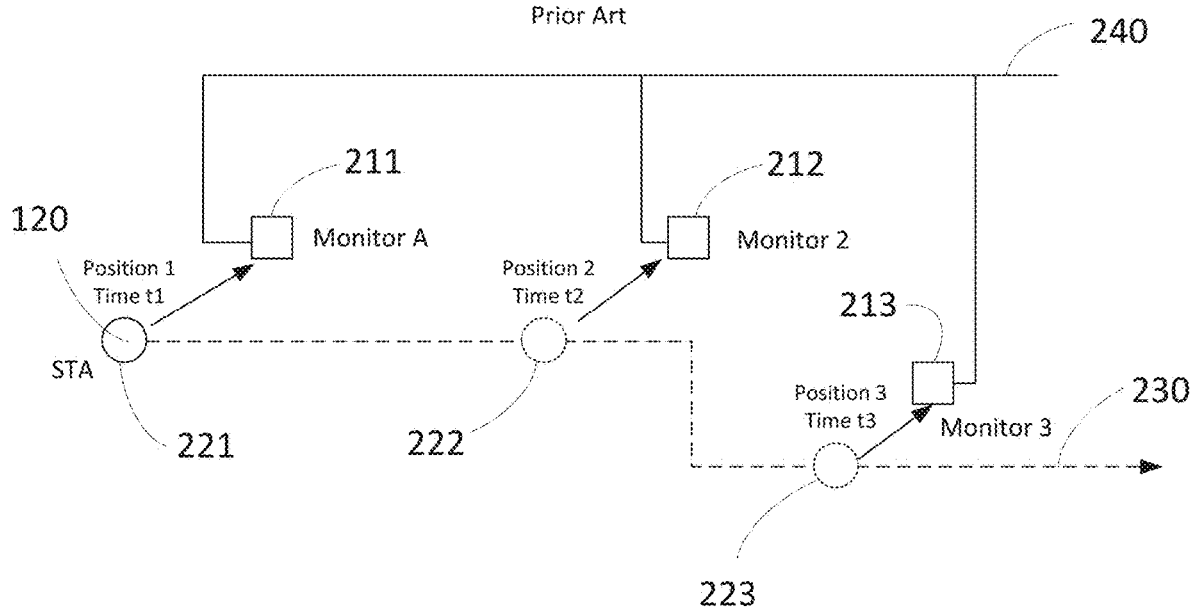
FIG. 2 is an exemplary schematic diagram of a ground based mobile STA tracking system.

As described with reference to FIG. 1 and FIG. 2, a STA may transmit a Probe Request and an AP may respond with a Probe Response. A Probe Request and a Probe Response are both medium access control (MAC) management frames and as such comply with the MAC frame format as defined in the Standard, using three Address fields in the MAC header. The first two address fields are used to indicate the receiving address (RA) and the transmitting station address (TA). In the case of a probe request the TA will be the address of the STA transmitting the request, but the RA may be an individual address or a group address. When monitoring from the air, the airborne monitoring STA 300 may detect a probe request from a particular ground based mobile STA. The address of that ground based mobile STA may be determined from the TA address field. But even if the RA address is an individual address, it is still not possible to know which AP is in the vicinity of that ground based mobile STA unless a Probe Response is received at the airborne monitoring STA with the RA address field set to that of the ground based mobile STA. Therefore, the airborne monitoring STA 300 is specifically looking for probe response packets where the AP address (TA) and the ground based mobile STA address (RA) can be determined. If such a packet is received, then it is known that a particular ground based mobile STA is in the vicinity of a particular AP.

Figure 4:
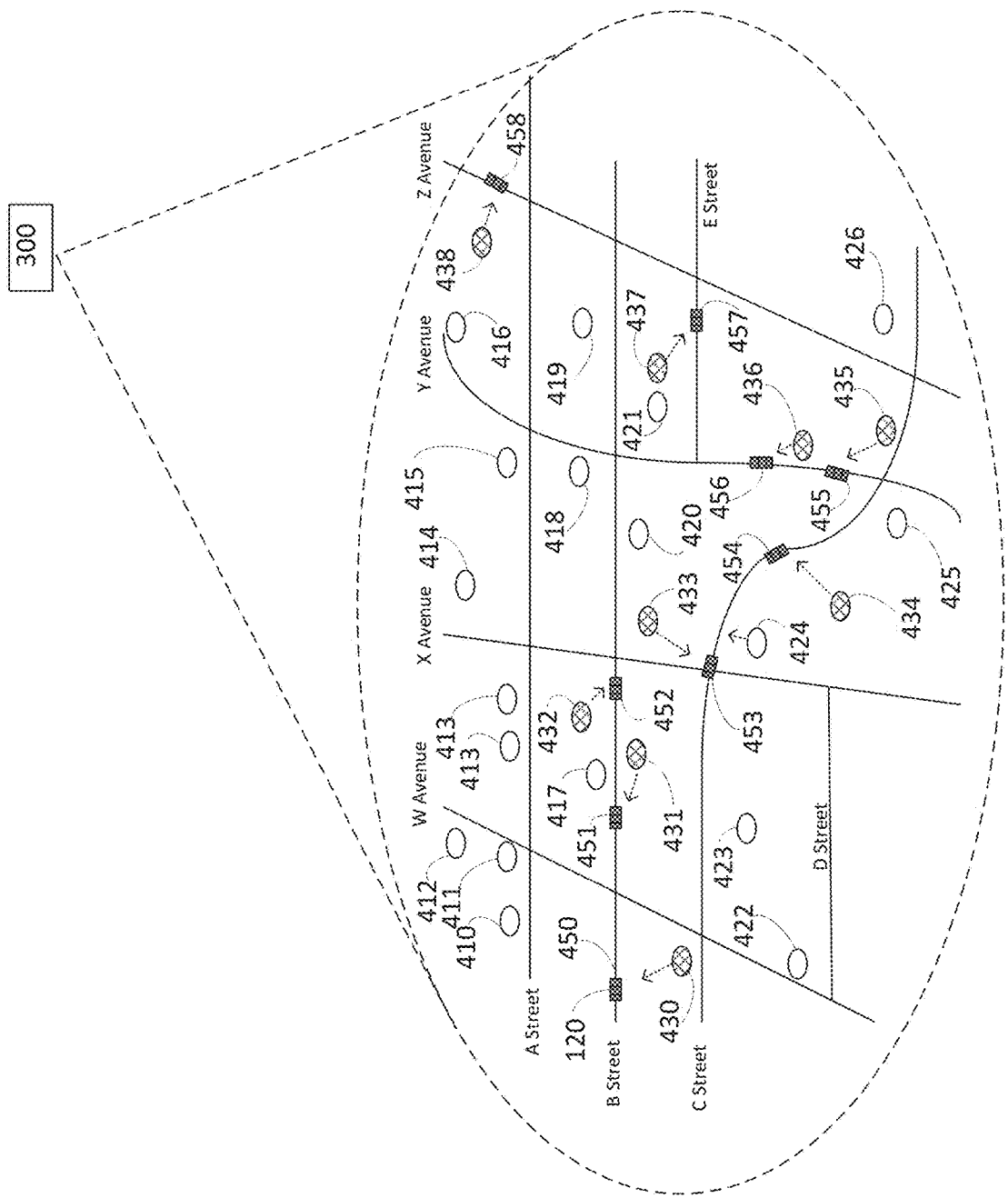
FIG. 4 is a diagram showing a tracking example based on the principles of the present disclosure.

FIG. 4 is an exemplary schematic diagram depicting an airborne Wi-Fi monitoring station 300 receiving signals from an area 470. Airborne monitoring STA 300 detects transmissions from APs 410 to 426, and 430 to 438. Airborne monitoring STA 300 has located each of these APs 410 to 426, and 430 to 438 and has plotted them on a road map of the area 470. The road map consists of A Street, B Street, C Street, and D Street, generally following an east west orientation, and of W Avenue, X Avenue, Y Avenue, and Z Avenue generally following a north south orientation.

A ground based mobile STA 120 enters the area 470 at the west end of B Street. Ground based mobile STA 120 may be a smartphone being carried by the driver of a vehicle. Ground based mobile STA 120 is periodically transmitting probe requests. When ground based mobile STA 120 is at position 450, AP 430 transmits a probe response to ground based mobile STA 120 and this probe response is received at airborne monitoring STA 300 where it is recorded. The probe response received at airborne monitoring STA 300 contains the addresses of ground based mobile STA 120 and AP 430.

As ground based mobile STA 120 continues east on B Street, when at position 451 AP 431 transmits a probe response to ground based mobile STA 120 and this probe response is received at airborne monitoring STA 300 where it is recorded. This probe response received at airborne monitoring STA 300 contains the addresses of ground based mobile STA 120 and AP 431. Just before turning south on X Avenue, when at position 452, AP 432 transmits a probe response to ground based mobile STA 120 and this probe response is received at airborne monitoring STA 300 where it is recorded. This probe response received at airborne monitoring STA 300 contains the addresses of ground based mobile STA 120 and AP 432.

Ground based mobile STA 120 then continues south on X Avenue and turns east on C Street. When at the intersection of C Street and X Avenue, position 453, AP 433 transmits a probe response, containing the addresses of ground based mobile STA 120 and AP 433, to ground based mobile STA 120 and this probe response is received at airborne monitoring STA 300 where it is recorded. Ground based mobile STA 120 continues east on C Street and at position 454 AP 434 transmits a probe response to ground based mobile STA 120 and this probe response, containing the addresses of ground based mobile STA 120 and AP 434, is received at airborne monitoring STA 300 where it is recorded. Turning north on Y Avenue, when ground based mobile STA 120 is at position 455 AP 435 transmits a probe response to ground based mobile STA 120 and this probe response is received at airborne monitoring STA 300 where it is recorded. This probe response received at airborne monitoring STA 300 contains the addresses of ground based mobile STA 120 and AP 435.

Then, when ground based mobile STA 120 is at position 456 AP 436 transmits a probe response, containing the addresses of ground based mobile STA 120 and AP 436, to ground based mobile STA 120 and this probe response is received at airborne monitoring STA 300 where it is recorded. Turning east on E Street, when ground based mobile STA 120 is at position 457, AP 437 transmits a probe response, containing the addresses of ground based mobile STA 120 and AP 437, to ground based mobile STA 120 and this probe response is received at airborne monitoring STA 300 where it is recorded. Turning north on Z Avenue, ground based mobile STA 120 travels across both B Street and A Street. Then, when ground based mobile STA 120 is at position 458, AP 437 transmits a probe response, containing the addresses of ground based mobile STA 120 and AP 438, to ground based mobile STA 120 and this probe response is received at airborne monitoring STA 300 where it is recorded.

It should be noted that the APs 410-438 may not be on the same channel. Also, this exemplary diagram uses a single mobile ground based mobile STA 120. In practice airborne monitoring STA 300 may be receiving many probe responses from many of the APs 410 to 426, and 430 to 438 with the addresses of many mobile, and stationary, STAs. Each ground based mobile STA 120 may be identified by its address and the times of reception and the locations of the APs may be tabulated at the airborne monitoring STA 300. Using this information, the likely track of the ground based mobile STA 120 can be estimated, in real time or historically.

Figure 5:
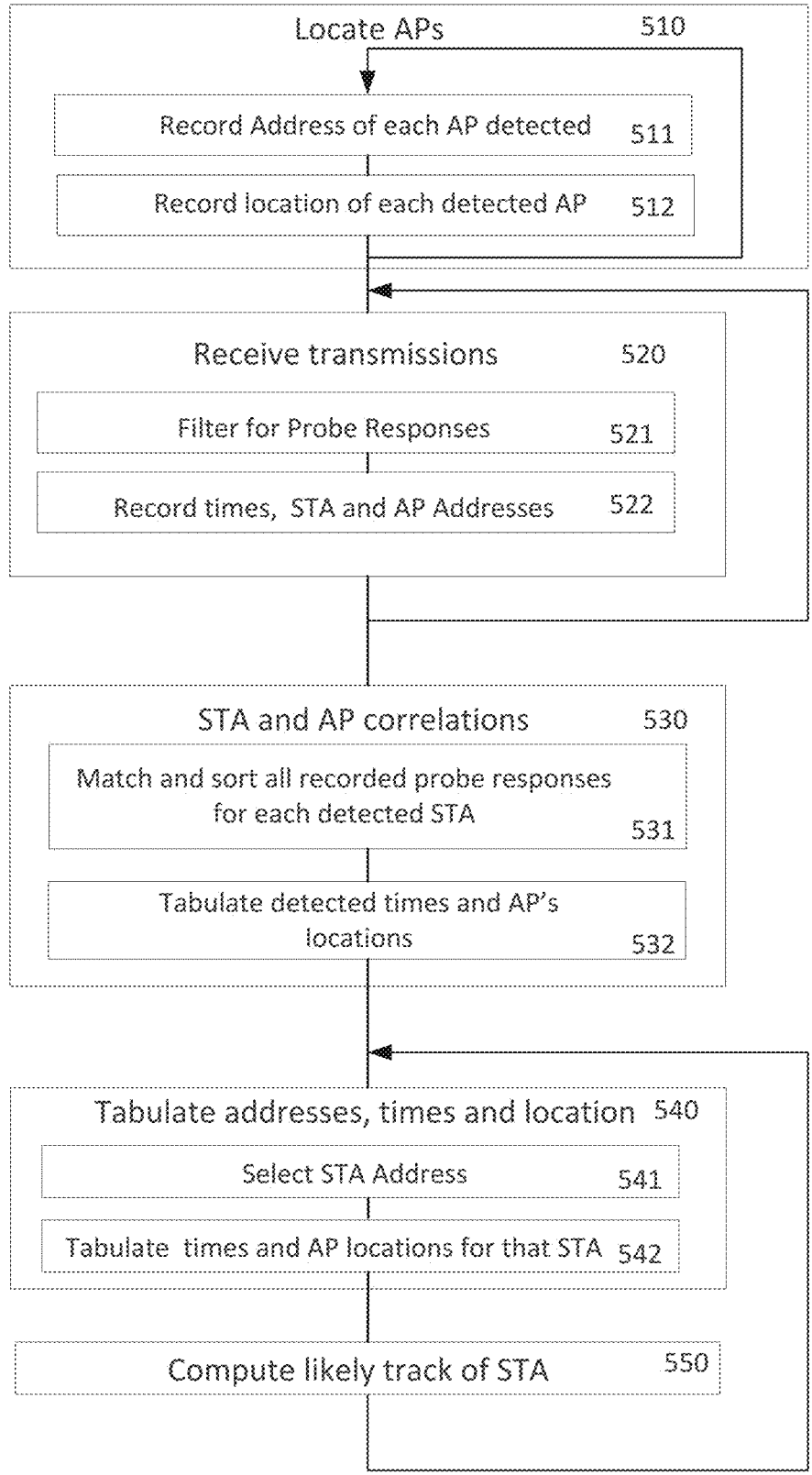
FIG. 5 illustrates exemplary method performed by an airborne monitoring station according to an embodiment of the disclosure.

FIG. 5 illustrates exemplary method 500 performed by an airborne monitoring station 300 according to an embodiment of the disclosure. Method 500 may start by step 510 where the locations of detected ground based APs in the area of interest 470 are located. The method used by the airborne monitoring STA 300 to geo-locate the ground based APs in the area 470 is not part of this disclosure, but the step of geo-locating the APs does form part of this disclosure. Methods for the geo-locating of ground based APs 120 using an airborne monitoring STA have been disclosed in U.S. patent application Ser. No. 14/847,707, entitled "GEO-LOCATION OF A WLAN DEVICE", U.S. patent application Ser. No. 14/989,338, entitled "ASSISTED PASSIVE GEO-LOCATION OF A WIRELESS LOCAL AREA NETWORK DEVICE" and U.S. Provisional application Ser. No. 15/220,059, entitled "GEO-LOCATION OF A WLAN DEVICE USING MOBILE MONITORING STATION," the entireties of all of which are incorporated herein by reference. Step 510 may include step 511 where the address of each detected AP is recorded. Each AP has a unique address known as the MAC (medium access control) Address. Step 510 may also include step 512 where the location of each AP is recorded. Steps 511 and 512 may be repeated so as to geo-locate as many APs in the in the area 470 as required.

Step 510 may be followed by step 520 where transmissions from the ground based networks 340 are received at the airborne monitoring STA 300. Step 520 may include step 521 where the received transmissions are filtered to find probe responses. Step 520 may also include step 522 where the times that the probe responses, filtered out in step 521, are recorded together with the addresses of the ground based mobile STAs and the APs which transmitted them. Steps 521 and 522 may be repeated in order to build up a comprehensive record of the times of the probe requests and responses.

Step 520 may be followed by step 530 where the records gathered in step 510 and 520 may be correlated. Step 530 may include step 531 where the addresses recorded in steps 510 and 520 are matched on a per STA basis such that, for each ground based mobile STA, detected through monitoring a probe response sent by an AP to that STA, the corresponding AP(s) and STA are sorted. Step 530 may include step 532 which may follow step 531 where the times of the detected probe responses, determined in step 520, are tabulated together with the AP and STA addresses and the AP location determined in step 510. Step 520 may be followed by step 540 where the addresses, times and location information are tabulated. Step 540 may include step 541 where a particular STA address may be selected. Step 541 may be followed by step 542 where the times of the detected probe responses are tabulated together with the locations of the APs for the selected STA. Step 540 may be followed by step 550 where the likely track of the STA selected in step 540 may be computed.

Various methods may be used to estimate the likely track. Such methods include noting and matching the STA path to the roads and pathways in the area of each AP. It will be understood by those skilled in the art that with knowledge of the time that the STA was detected, the location of the AP that detected it, and knowledge of the topography, road and path system, i.e. a map of the area, it may be possible to determine the likely track that the STA took or is taking. To estimate the track of a number of different STAs, step 550 may be followed by step 540 with a different STA address being chosen at step 541.

Method 500 may be used to gather information and estimate the tracks of a number of ground based mobile STAs historically, or it may be used to track a specific ground based mobile STA in real time. In method 500, an example of a ground based mobile STA is ground based mobile STA 120 as described in FIGS. 1, 2, and 4.

The location information gathered in step 510 may be recorded and used later, and, in this case it may only be necessary to follow steps 520, 530, 540, and 550 in order to track one or more ground based mobile STAs 120 across the same area of interest 470.

At step 522 it is noted that at the same time, or at times close to each other, probe responses were detected from more than one AP to the same ground based mobile STA 120. This would indicate that the ground based mobile STA 120 was in the vicinity of more than one AP and with knowledge of the locations of these APs, as recorded in step 512, the location estimate of the ground based mobile STA 120 at that moment in time may be estimated.

As previously described with reference to FIGS. 4 and 5, when using an airborne monitoring STA 300, it is the probe responses sent by the ground based APs that are monitored and recorded in step 522. The probe responses contain the addresses of both the AP and the STA and furthermore the location of each AP is known as determined in step 510. Hence the approximate location of the STA 120 can be inferred, i.e. within the vicinity of that AP.

Figure 6:
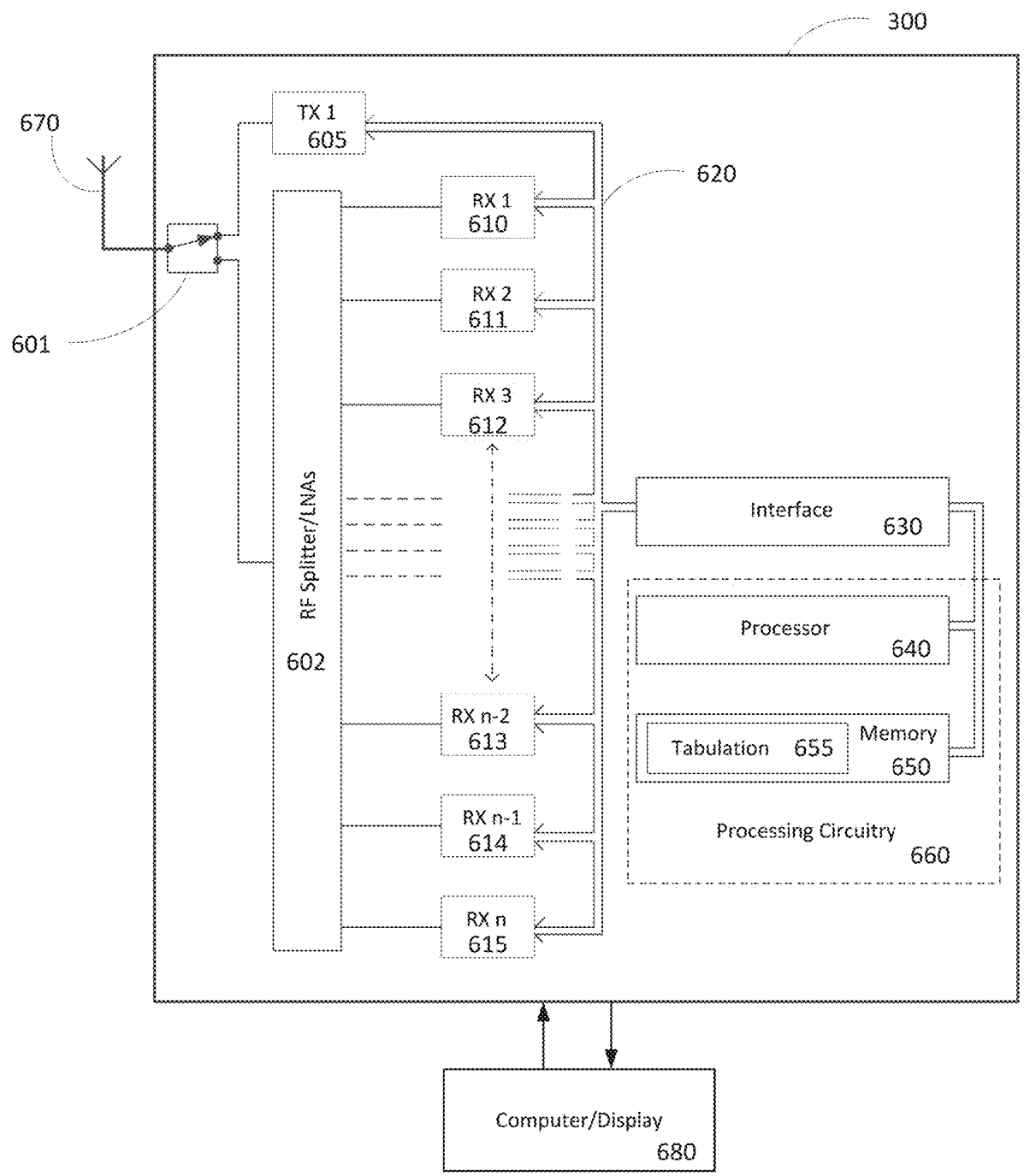
FIG. 6 is a block diagram of an embodiment of an airborne monitoring STA constructed in accordance with the principles of this disclosure.

FIG. 6 is a block diagram of an example airborne monitoring STA 300 constructed in accordance with the principles of the present invention. In one embodiment, an antenna 670, is connected to an RF switch 601 which is used to connect the antenna 670 to either the transmitter 605, or to the input of an RF splitter/LNA block 602. Block 602 includes RF circuitry that splits the incoming signal from the antenna 670, via the RF switch 601 into several outputs each of which is connected to one of the receiver blocks 610 to 615. Note that the details of the RF splitter/LNA block 602 may vary as the number of receivers is varied and that the number of receivers is not fixed.

In some embodiments, one or more low noise amplifiers (LNA) are used, in combination with one or more RF splitters, such that the splitter loss is compensated for and that the effective noise figure for the receivers 610 to 615 may be set to a low value, for example 2 to 3 dB. This embodiment of the disclosure represents an airborne monitoring STA 300 that has a single transmitter 605 that may be used to transmit packets to a specific target device, AP or STA, or to send management or control packets to broadcast or specific addresses. Packets received at the antenna 601 may be received by every receiver block 610 to 615 via RF switch 601.

Each receiver block 610 to 615 may be tuned to receive on a different channel, or groups of receivers may be tuned to receive on the same channel. By having more than one receiver tuned to the same channel the chance of receiving a transmission on that channel is increased. By tuning receivers to different channels, the chance of receiving more transmissions is increased. As previously explained, a mobile STA 120 may scan across the channels transmitting probe requests. The ground based APs may be tuned to different channels and hence the probe responses that may be received at the airborne monitoring STA 300 may be on many channels. Therefore the use of multiple receiver blocks 610 to 615 improves the chances of receiving probe requests.

Airborne monitoring STA 300 may include an interface block 630, and processing circuitry 660 having a processor 640, and a memory 650. The interface block 630 may act as the interface control between the processor 640, the transmitter 605 and the receivers 610 to 615 via the control bus 620. The interface 630 and/or the processing circuitry 660 may include elements for constructing control, management and data packets and sending them to the transmitter 605 for the transmission of packets via the RF switch 601 and the antenna 670.

According to this embodiment of the disclosure, the interface 630 and/or the processor 640 is configured to transmit management, data and control packets and to receive input signals based upon the IEEE 802.11 standard. The processor 640 is configured to measure and monitor input signals' attributes, including the preamble, MAC header and timing according to the IEEE 802.11 standard. Interface 630 and/or processor 640 is arranged to receive input signals and the processor 640 is arranged to measure and monitor input signals' attributes, including management, data and control packets transmitted by an access point or station that is based upon the IEEE 802.11 Standard.

The interface 630 and/or the processor 640 may include elements for the measuring and/or calculating attributes of received signals (input signals) that are passed from the receivers 610 to 615. The memory 650 may store instructions for executing any method described in this disclosure, input signals, and results of processing of the processor 640, signals to be outputted and the like.

Airborne monitoring STA 300 may include a computer/display 680 that interfaces with the processor 640 and may also interface with the memory module 650. Computer/Display 680 may be used by an operator to display the results of the operations described in this disclosure in the form of a location or locations displayed on a map display. The Computer/Display 680 may be used to input control messages to the processor 640 such as to starting and stopping of the transmission and reception of packets as described in this disclosure.

In addition to a traditional processor and memory, processing circuitry 660 may include integrated circuitry for processing and/or control, e.g., one or more processors and/or processor cores and/or FPGAs (Field Programmable Gate Array) and/or ASICs (Application Specific Integrated Circuitry). Processor 640 may be configured to access (e.g., write to and/or read from) memory 650, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 650 may be configured to store code executable by processor 640 and/or other data, e.g., data pertaining to communication, e.g., configuration and/or address data of nodes, etc. Memory 650 also includes the tabulation code 655 configured to perform the processes described herein when executed, especially the processes described with reference to FIG. 5. In other words, memory 650 has instructions that, when executed by processor 640, configures processor 640 to perform the tabulation processes described.

With reference to FIG. 4, each of the multiple receivers 610 to 615 may be used to receive the probe response packets transmitted by the ground APs 410 to 426 and 430 to 438 within the area 470. The interface 630 and/or the processor 640 may be used to perform the methods as described with reference to FIG. 5 and to output the results to the computer/display 680. The interface 630 and/or processor 640 may also be used to perform the tabulation of the STA addresses, the corresponding AP addresses, the times of reception of the probe responses and the location of the APs.

Figure 7:
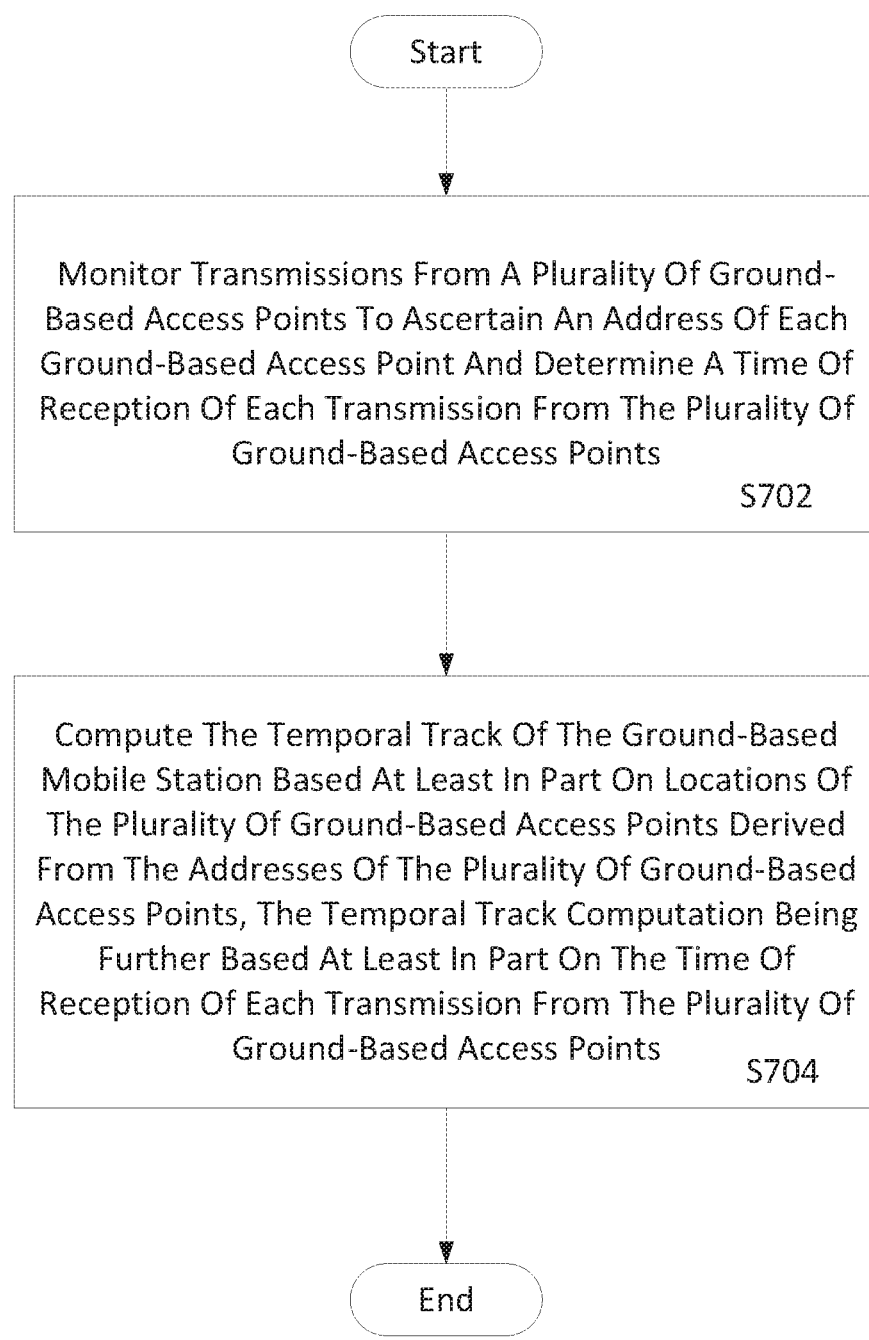
FIG. 7 is a flowchart of an exemplary process for in an airborne monitoring station of computing a temporal track for a ground-based mobile station.

FIG. 7 is flowchart of an exemplary process in an airborne monitoring station 300 of computing a temporal track for a ground-based mobile station 120. The process includes monitoring, via the processor 640, transmissions from a plurality of ground-based access points 340 to ascertain an address of each ground-based access point 340 and to determine, via the processor 640, a time of reception of each transmission from the plurality of ground-based access point 340 (block S702). The process also includes computing, via the processor 640, the temporal track of the ground-based mobile station 120 based at least in part on locations of the plurality of ground-based access points 340 derived from the addresses of the plurality of ground-based access points 340, the temporal track computation being further based at least in part on the time of reception of each transmission from the plurality of ground-based access points 340 (block S704).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the method used to locate the APs, the method used to cover the ground area of interest, the details of the tabulation process, the number of transmitters and receivers used in the airborne monitoring STA, the commands and display details used by an operator. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope

What is claimed is:

1. A method for an airborne monitoring station of determining a temporal track for a ground-based mobile station, the method comprising:
   geo-locating, via the airborne monitoring station, a plurality of ground-based access points;
   monitoring transmissions from the plurality of ground-based access points:
   filtering the transmissions from the plurality of ground-based access points to determine transmissions containing both an address of a corresponding ground-based access point and an address of the ground-based mobile station;
   determining a time of reception of each transmission from the plurality of ground-based access points;
   recording a time at which the ground-based mobile station is in proximity to one of the ground based access points identified by an address of the ground based access point; and
   determining the temporal track of the ground-based mobile station based at least in part on a combination of:
   locations and addresses of the plurality of ground-based access points; and
   the times when the ground-based mobile station is in proximity of each ground-based access point.

2. The method of claim 1, wherein the addresses of the plurality of ground-based access points and the addresses of the ground-based mobile stations are contained in probe response management frames contained in the monitored transmissions from the plurality of ground-based access points.

3. The method of claim 1, wherein a transmission from the ground-based mobile station to a ground-based access point has a receiving address and each transmission from the plurality of ground-based access points has a transmit station address.

4. The method of claim 1, wherein the temporal track is determined by correlating the locations of the plurality ground-based access points with a road map of an area monitored by the airborne monitoring station.

5. The method of claim 1, further comprising monitoring transmissions from the ground-based mobile station to ascertain an address of the ground-based mobile station to differentiate between the ground-based mobile station for which the temporal track is determined from other ground-based mobile stations.

6. The method of claim 1, wherein the monitored transmissions from the plurality of ground-based access points contain an address of the ground-based mobile station to differentiate between the ground-based mobile station for which the temporal track is determined from other ground-based mobile stations.

7. The method of claim 1, further comprising correlating the times of receipt with the locations of the ground-based access points to determine a location of the ground-based mobile station with respect to the ground-based access point at each time of receipt.

8. An airborne monitoring station configured to determine a temporal track for a ground-based mobile station, the airborne monitoring station comprising:
   processing circuitry and interface circuitry configured to:
   geo-locate a plurality of ground-based access points;

monitor transmissions from the plurality of ground-based access points;

filter the transmissions from the plurality of ground-based access points to determine transmissions containing both an address of a corresponding ground-based access point and an address of the ground-based mobile station;

determine a time of reception of each transmission from the plurality of ground-based access points;

recording a time at which the ground-based mobile station is in proximity to one of the ground based access points identified by an address of the ground based access point; and determine the temporal track of the ground-based mobile station based at least in part on a combination of:

locations and addresses of the plurality of ground-based access points; and the times when the ground-based mobile station is in proximity of each ground-based access point.

9. The airborne monitoring station of claim 8, wherein the addresses of the plurality of ground-based access points and the addresses of the ground-based mobile stations are contained in probe response management frames contained in the monitored transmissions from the plurality of ground-based access points.

10. The airborne monitoring station of claim 8, wherein a transmission from the ground-based mobile station to a ground-based access point has a receiving address and each transmission from the plurality of ground-based access points has a transmit station address.

11. The airborne monitoring station of claim 8, wherein the temporal track is determined by correlating the locations of the plurality ground-based access points with a road map of an area monitored by the airborne monitoring station.

12. The airborne monitoring station of claim 8, wherein the processing circuitry is further configured to monitor transmissions from the ground-based mobile station to ascertain an address of the ground-based mobile station to differentiate between the ground-based mobile station for which the temporal track is determined from other ground-based mobile stations.

13. The airborne monitoring station of claim 8, wherein the monitored transmissions from the plurality of ground-based access points contain an address of the ground-based mobile station to differentiate between the ground-based mobile station for which the temporal track is determined from other ground-based mobile stations.

14. The airborne monitoring station of claim 8, wherein the processing circuitry is further configured to correlate the times of receipt with the locations of the ground-based access points to determine a location of the ground-based mobile station with respect to the ground-based access point at each time of receipt.

15. An airborne monitoring station configured to determine a temporal track for a ground-based mobile station, the airborne monitoring station comprising:

a memory configured to store a plurality of ground-based access point addresses and times of receipt of probe responses from the plurality of ground-based access points; and a processor and interface configured to:

geo-locate a plurality of ground-based access points;

monitor the probe responses from the plurality of ground-based access points;

filter the transmissions from the plurality of ground-based access points to determine transmissions containing both an address of a corresponding ground-based access point and an address of the ground-based mobile station;

record a time at which the ground-based mobile station is in proximity to one of the ground-based access points identified by the address of the ground-based access point;

determine a location of each ground-based access point based on the address of the ground-based access point; and determine the temporal track of the ground-based mobile station based at least in part on a combination of:

locations and addresses of the plurality of ground-based access points; and the times at which the ground-based mobile station is in proximity of each ground-based access point.

16. The airborne monitoring station of claim 15, wherein the processor is further configured to correlate the times of receipt with the locations of the ground-based access points to determine the temporal track of the ground-based mobile station.

* * * * *